UNITED STATES PATENT OFFICE.

SIEGMUND RADLAUER, OF BERLIN, GERMANY.

SALICYL-ANILID.

SPECIFICATION forming part of Letters Patent No. 526,258, dated September 18, 1894.

Application filed March 22, 1894. Serial No. 504,599. (No specimens.)

*To all whom it may concern:*

Be it known that I, SIEGMUND RADLAUER, chemist, of 160 Friedrichstrasse, Berlin, in the Kingdom of Prussia and German Empire, have invented a new and Improved Anti-Pyretic and Anti-Neuralgic Preparation, of which the following is a specification.

This invention relates to a new or improved anti-pyretic and anti-neuralgic preparation and which is prepared by heating acetanilid with salicylic acid in approximately molecular proportions to about 100° centigrade. The resulting oily fluid is a saline additive product of acetanilid and salicylic acid and has the following formula:

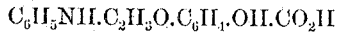

Upon heating this to 120° centigrade the desired anti-pyretic and anti-neuralgic product is obtained with the evolution of acetic acid.

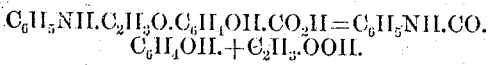

A convenient method of carrying this invention into effect is as follows: One hundred parts by weight of acetanilid are thoroughly mixed with one hundred and two parts by weight of salicylic acid and the mixture is heated in a steam bath to about 100° centigrade or until an oily fluid is formed. The temperature is then raised to from 120° to 150° centigrade or above, a larger quantity of the salicyl-anilid being produced at the higher temperature. The product contains also uncombined acetanilid and salicylic acid, but it is not necessary to separate the salicyl-anilid from these two substances, as they are antipyretic and antineuralgic substances, and do not disturb the medicinal effect of the salicyl-anilid. The resulting product is then allowed to cool and forms a cake which may be pulverized or powdered. It is insoluble in water but soluble in alcohol and forms a base upon which acids can react. Its melting point is reached at about 100° centigrade.

What I claim, and desire to secure by Letters Patent of the United States, is—

1. A new and improved antipyretic and anti-neuralgic preparation consisting of salicyl-anilid, substantially as described.

2. A new and improved anti-pyretic and anti-neuralgic preparation consisting of salicyl-anilid, together with uncombined salicylic acid and acetanilid, substantially as described.

3. The hereinbefore described process for the preparation of an anti-pyretic and anti-neuralgic compound consisting in heating together approximately molecular proportions of acetanilid and salicylic acid, substantially as described.

In witness whereof I have hereunto set my hand in presence of two witnesses.

SIEGMUND RADLAUER.

Witnesses:
 PAUL FISCHER,
 HANS BAUERLEIN.